US012270705B2

(12) United States Patent
Zhan et al.

(10) Patent No.: US 12,270,705 B2
(45) Date of Patent: Apr. 8, 2025

(54) OPTICAL META-LENS SPECTROMETER TO ANALYZE SPECTRAL CHARACTERISTICS OF LIGHT

(71) Applicant: Tunoptix, Inc., Seattle, WA (US)

(72) Inventors: Alan Zhan, Lake Forest Park, WA (US); Shane Alexander Colburn, Seattle, WA (US); Arka Majumdar, Kirkland, WA (US)

(73) Assignee: Tunoptix, Inc., Seattle, WA (US)

( * ) Notice: Subject to any disclaimer, the term of this patent is extended or adjusted under 35 U.S.C. 154(b) by 137 days.

(21) Appl. No.: 17/941,946

(22) Filed: Sep. 9, 2022

(65) Prior Publication Data

US 2024/0085241 A1  Mar. 14, 2024

(51) Int. Cl.
*G01J 3/28* (2006.01)
*G01J 3/02* (2006.01)
*G02B 1/00* (2006.01)
*H04N 23/45* (2023.01)

(52) U.S. Cl.
CPC .......... *G01J 3/2823* (2013.01); *G01J 3/0208* (2013.01); *G01J 2003/2826* (2013.01); *G02B 1/002* (2013.01); *H04N 23/45* (2023.01)

(58) Field of Classification Search
CPC .............. G01J 3/2823; G01J 3/0208; G01J 2003/2826; G01J 3/0256; G01J 3/28; G01J 3/2803; G02B 1/002; G02B 7/003; G02B 27/0068; H04N 23/45
See application file for complete search history.

(56) References Cited

U.S. PATENT DOCUMENTS

2020/0264343 A1* 8/2020 Han .................... G02B 1/14
2021/0127101 A1   4/2021 Roh et al.
2021/0223104 A1* 7/2021 Siddique ............... G01J 3/26
(Continued)

FOREIGN PATENT DOCUMENTS

CN    114705291 A    7/2022

OTHER PUBLICATIONS

Jin, C., Zhang, J. & Guo, C. (2019). Metasurface integrated with double-helix point spread function and metalens for three-dimensional imaging. Nanophotonics, 8(3), 451-458. https://doi.org/10.1515/nanoph-2018-0216 (Year: 2019).*
(Continued)

*Primary Examiner* — Tarifur R Chowdhury
*Assistant Examiner* — Akbar H. Rizvi
(74) *Attorney, Agent, or Firm* — Cooley LLP

(57) ABSTRACT

In an embodiment, an apparatus includes a meta-optics lens having a point spread function. The meta-optics lens is configured to receive light associated with a scene and output transformed light. At least one value of at least one mathematical property of the transformed light is dependent upon a set of wavelengths associated with the transformed light. The apparatus further includes a processor configured to receive a representation of the transformed light. The processor is further configured to determine the at least one value of the at least one mathematical property of the transformed light using the representation of the transformed light. The processor is further configured to determine spectrum information associated with the scene based on the at least one value and the point spread function.

22 Claims, 9 Drawing Sheets

(56) References Cited

U.S. PATENT DOCUMENTS

2021/0350590 A1* 11/2021 Kim .......................... G01J 3/28

OTHER PUBLICATIONS

Arya, G. et al., "End-to-End Optimization of Metasurfaces for Imaging with Compressed Sensing," Massachusetts Institute of Technology, arXiv:2201.12348v2, Sep. 1, 2022, 1-14.
Lin, Z. et al., "End-to-end metasurface inverse design for single-shot multi-channel imaging," Massachusetts Institute of Technology, arXiv:2111.01071v1 [physics.optics], Nov. 2, 2021, 1-17.
Colburn S., "Design of computational imaging systems using wavefront-coded dielectric metasurfaces", University of Washington, Dec. 31, 2020, 157 pages.
Extended European Search Report for European Application No. EP23196417.2, mailed on Feb. 1, 2024, 13 pages.

* cited by examiner

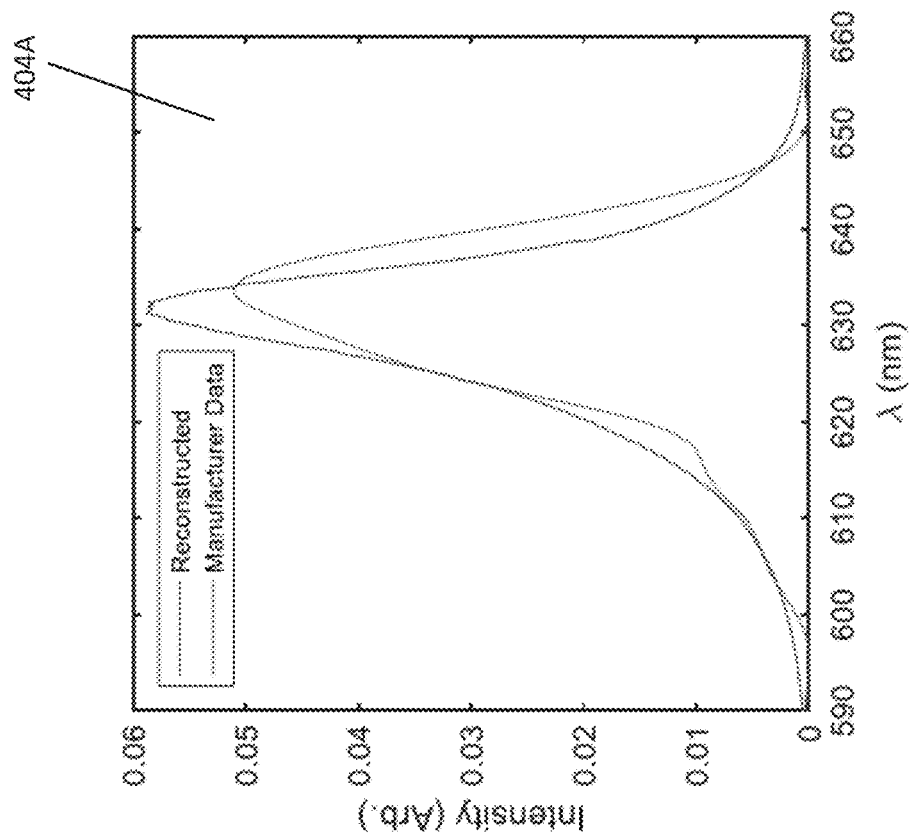
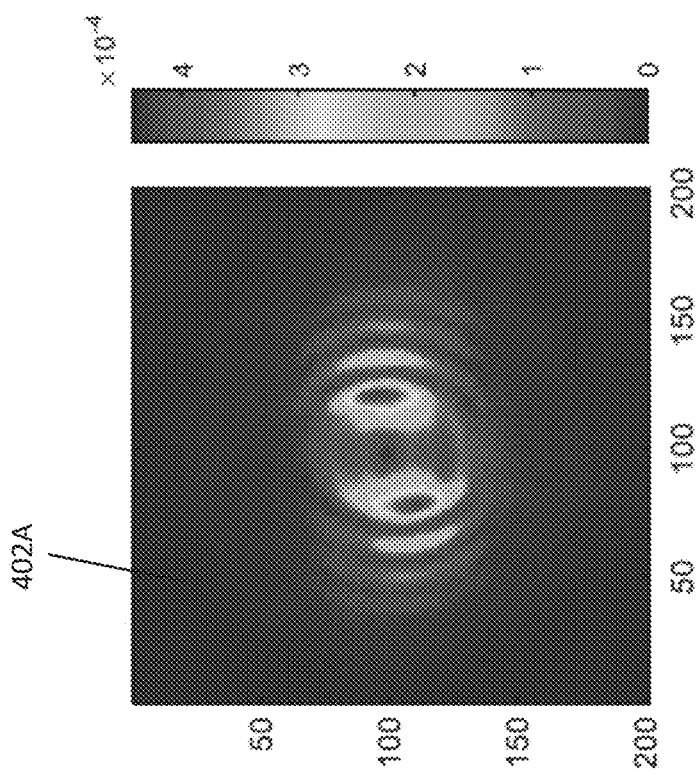
FIG. 4A

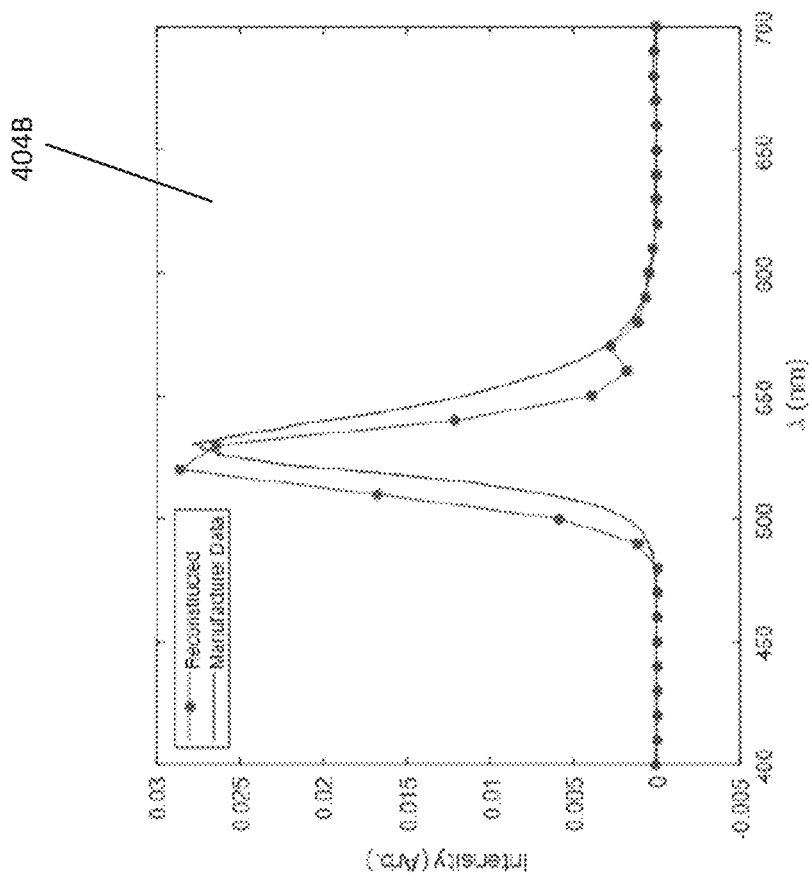
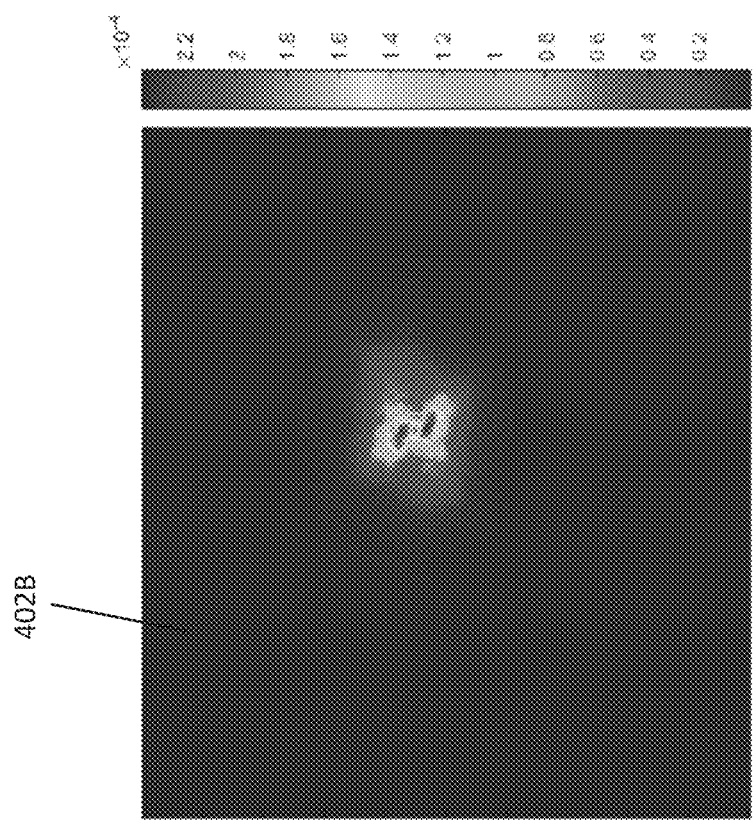
FIG. 4B

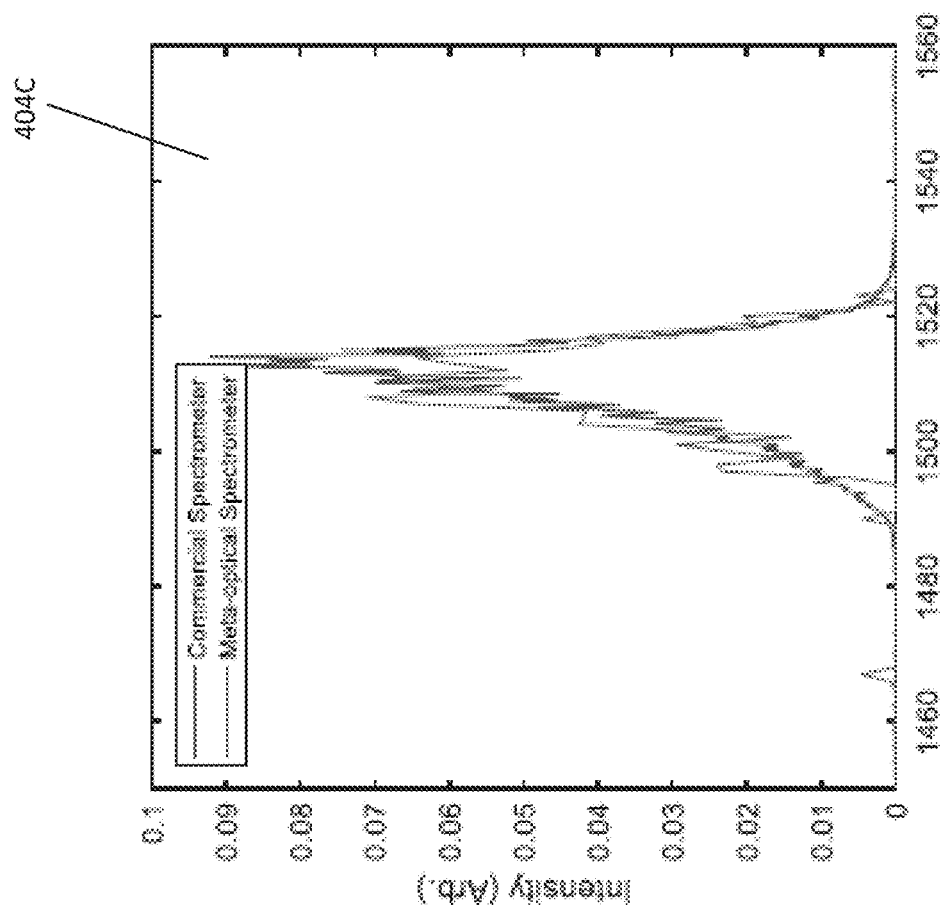
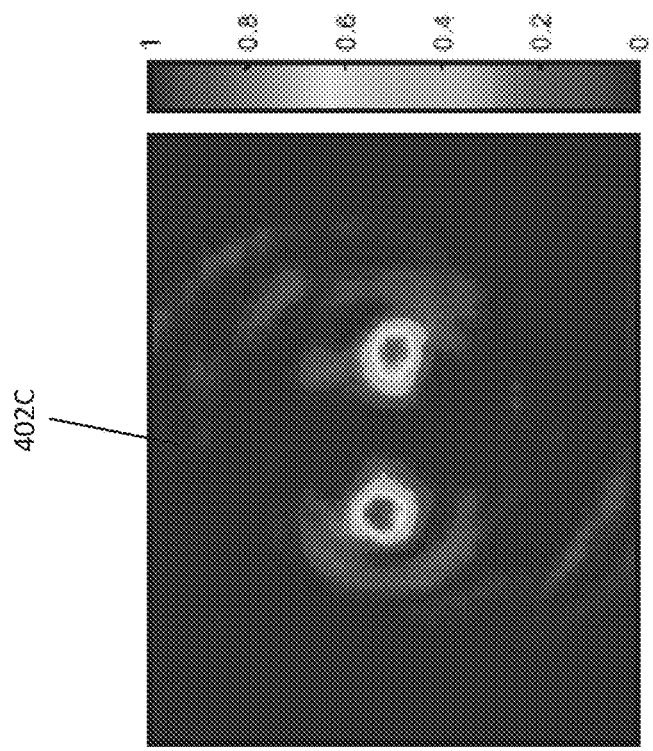
FIG. 4C

600

602 Receive a representation of a transformed light

↓

604 Determine a value of at least one mathematical property of the transformed light

↓

606 Determine spectrum information associated with light using the value of the at least one mathematical property and a point spread function

↓

608 Generate an image associated with a scene based on the spectrum information

FIG. 6

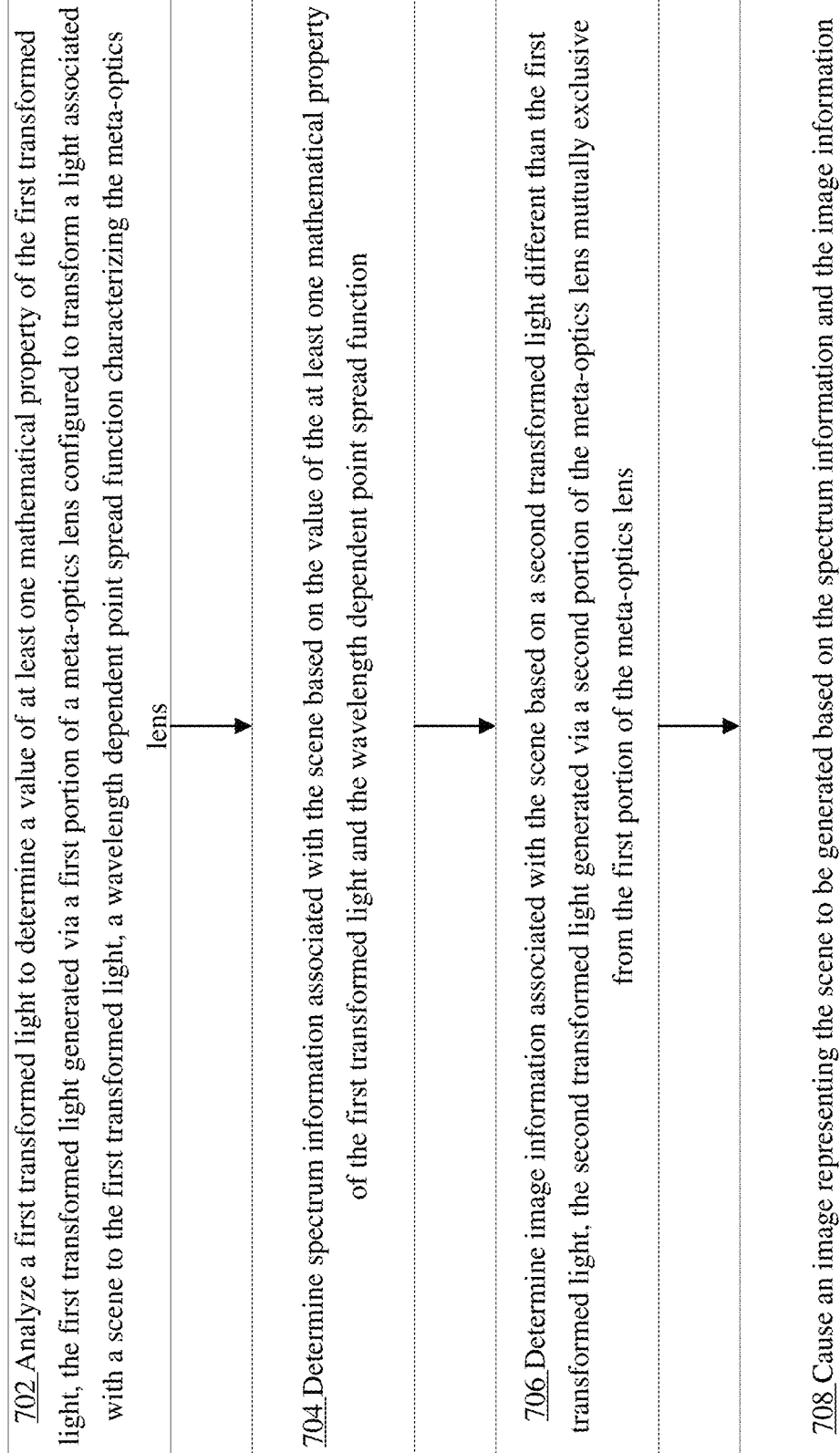

OPTICAL META-LENS SPECTROMETER TO ANALYZE SPECTRAL CHARACTERISTICS OF LIGHT

FIELD

One or more embodiments are related to an optical meta-lens spectrometer that can analyze spectral characteristics of light.

BACKGROUND

Some known solutions for high-performance spatial and spectral resolution imaging are pushbroom systems that generate full data cube hyperspectral images (x, y, λ) by acquiring and tiling two-dimensional (2D) sub images (x, λ), with the second spatial dimension (y) given by relative motion between the object and camera. Pushbroom systems, however, can sometimes compare poorly relative to lower performance snapshot systems in terms of size, weight, and power (SWaP). Pushbroom systems may sometimes have a larger than desirable size to produce a desired chromatic dispersion for high spectral resolution, larger than desirable weight due to the use of bulky glass optics, and/or higher than desirable power and bandwidth to process, store, and transmit high-dimensional hyperspectral data. In contrast, snapshot systems may fit within the form factor of a typical camera module, have reduced weight from their comparatively simple optical systems, and consume less power to store and transmit lower dimensional grayscale (2D) image data. Some snapshot systems, however, may be unable to produce high-quality spatial and spectral data. These current performance limitations of low-SWaP hyperspectral imaging systems can limit the quality of obtainable data for, for example, studying solar phenomena or performing space weather monitoring and prediction.

SUMMARY

In an embodiment, an apparatus includes a meta-optics lens having a point spread function. The meta-optics lens is configured to receive light associated with a scene and output transformed light. A value of at least one mathematical property of the transformed light is dependent upon a set of wavelengths associated with the light. The apparatus further includes an image sensor configured to capture the transformed light. The apparatus further includes a processor operatively coupled to the image sensor. The processor is configured to receive a representation of the transformed light from the image sensor. The processor is further configured to determine the value of the at least one mathematical property of the transformed light. The processor is further configured to determine spectrum information associated with the light using the value of the at least one mathematical property and the point spread function. The processor is further configured to generate an image associated with the scene based on the spectrum information.

In an embodiment, a method includes analyzing a first transformed light to determine a value of at least one mathematical property of the first transformed light. The first transformed light is generated via a first portion of a meta-optics lens configured to transform a light associated with a scene to the first transformed light. A wavelength dependent point spread function characterizes the meta-optics lens. The method further includes determining spectrum information associated with the scene based on the value of the at least one mathematical property of the first transformed light and the wavelength dependent point spread function. The method further includes determining image information associated with the scene based on a second transformed light different than the first transformed light. The second transformed light is generated via a second portion of the meta-optics lens mutually exclusive from the first portion of the meta-optics lens. The method further includes causing an image representing the scene to be generated based on the spectrum information and the image information.

In an embodiment, an apparatus includes a meta-optics lens having a point spread function. The meta-optics lens is configured to receive light associated with a scene and output transformed light. At least one value of at least one mathematical property of the transformed light is dependent upon a set of wavelengths associated with the transformed light. The apparatus further includes a processor configured to receive a representation of the transformed light. The processor is further configured to determine the at least one value of the at least one mathematical property of the transformed light using the representation of the transformed light. The processor is further configured to determine spectrum information associated with the scene based on the at least one value and the point spread function.

BRIEF DESCRIPTION OF THE DRAWINGS

FIGS. 4A-4C shows examples of light produced by a meta-optics lens and an associated spectral reconstruction, according to an embodiment.

FIG. 6 shows a flowchart of a method for generating an image associated with a scene based on spectrum information, according to an embodiment.

FIG. 7 shows a flowchart of a method to cause an image representing a scene to be generated based on spectrum information and image information, according to an embodiment.

DETAILED DESCRIPTION

Figure 1:
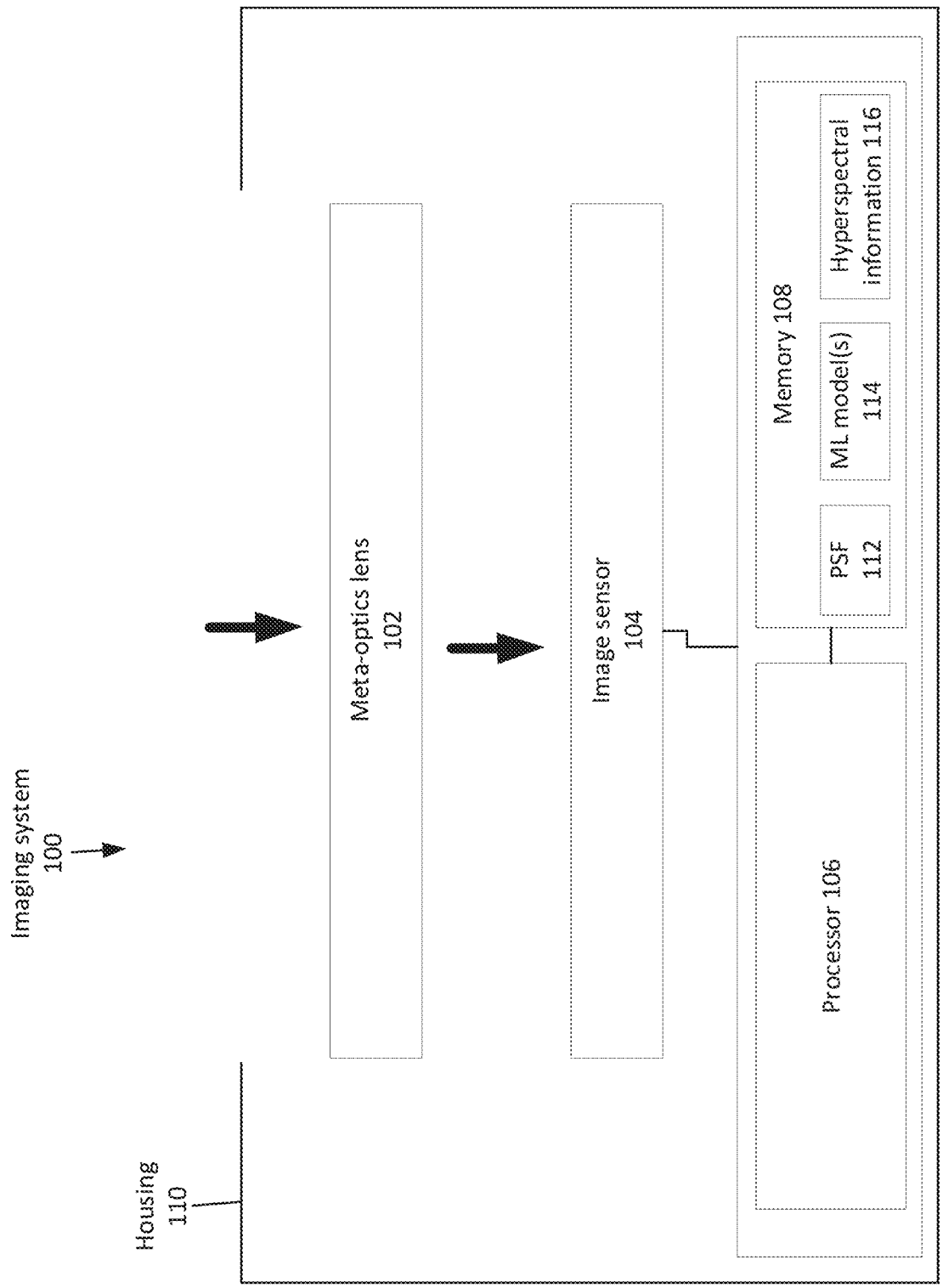
FIG. 1 shows a diagram representing an imaging system, according to an embodiment.

Some implementations use meta-optics in combination with computational postprocessing software to extract spectral information from a scene. In some implementations, this can be done to make a spectrometer (e.g., measuring spectral intensity at a single point in space) and/or for hyperspectral imaging (e.g., determining a hyperspectral data cube, which can comprise spectral information over a range of spatial coordinates).

Some implementations reduce the size, weight, and power of cameras (e.g., spectrometers and hyperspectral cameras) based on a hybrid of front-end meta-optics and back-end computational postprocessing software. Some implementations use a metasurface to apply a well-conditioned, wavelength-dependent transformation on incident light, which can be decoded via a low-latency postprocessing algorithm to extract a high-fidelity spectrum. The front-end metasurface will exhibit a point spread function (PSF) that changes with wavelength, exploiting a combination of phase mask engineering across the full surface as well as the local dispersion characteristics of nano-scatterers. In some implementations, the back-end software can use filtering and/or conversion methods to convert the raw sensor data into a hyperspectral image, simultaneously achieving high spatial and spectral resolution while maintaining robustness and generalizability to different environments, image features, and spectral content. In some implementations, the use of metasurfaces enables higher-NA [numerical aperture] imaging, as well as improved control over the dispersion of the nano-scatterers. The large number of degrees of freedom in a metasurface and/or the resonant nature of the scatterers can enhance wavelength discrimination compared to some known gratings. Finally, end-to-end co-optimization of the front end and back end, coupled with multi-scale inverse electromagnetic design, can be used to realize an improved (e.g., optimal) combination of optics and reconstruction software to achieve improved (e.g., maximized) spectral and spatial resolution while minimizing sensor volume.

Some implementations are related to a spectrometer and/or hyperspectral imager that enables compact form factor and high spatial and spectral resolution. Some implementations use a combination of meta-optics that encode light of different wavelengths on a sensor in a manner that makes the signals produced by the sensor amenable to high-fidelity reconstruction using software. Some known spectrometer and/or hyperspectral imaging techniques involve bulky and/or expensive equipment that increases system size, entail moving parts, and/or sacrifice the achievable spatial or spectral resolution, which can be undesirable in some situations. Some implementations can be applied in a wide range of applications, such as remote sensing, medical imaging, consumer electronics, scientific research, defense, and/or the like. High-performance, small form factor solutions for spectral sensing and hyperspectral imaging could be desirable across these application domains in at least some scenarios. The combination of encoding spectral information via meta-optics and decoding using computational techniques can provide for creating visible-infrared (IR) imaging systems with ultra-low size, weight, and power that can capture spectra as well as hyperspectral images at a high framerate while maintaining high resolution and signal-to-noise ratio (SNR).

Some implementations use inherent meta-optic chromatic aberrations for improving spectral resolution. Metasurfaces can exhibit chromatic aberrations arising from their phase discontinuities and scatterer dispersion. While these aberrations can degrade image quality, some techniques described herein instead intentionally exploit and enhance these aberrations to improve (e.g., maximize) spectral resolution.

Some implementations use co-optimization of a meta-optical front end and computational back end. Some implementations use co-optimization of meta-optics and a corresponding computational back-end reconstruction algorithm via an end-to-end system. In some implementations, the spectral and spatial resolution of the hyperspectral camera determine the figure of merit (FOM) for optimization.

FIG. 1 shows a diagram representing an imaging system 100, according to an embodiment. The imaging system 100 can include a meta-optics lens 102, an image sensor 104, a processor 106, and a memory 108. The image sensor 104, processor 106, and/or memory 108 can be communicably coupled to one another (e.g., via a system bus). In some implementations, the meta-optics lens 102, image sensor 104, processor 106, and/or memory 108 can be housed in a housing 110. In some implementations, the imaging system 100 is a camera, spectrometer, and/or hyperspectral imager.

The processor 106 can be, for example, a hardware based integrated circuit (IC) or any other suitable processing device configured to run and/or execute a set of instructions or code. For example, the processor 106 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 106 can be configured to run any of the methods and/or portions of methods discussed herein.

The memory 108 can be, for example, a random-access memory (RAM), a memory buffer, a hard drive, a read-only memory (ROM), an erasable programmable read-only memory (EPROM), and/or the like. The memory 108 can be configured to store any data used by the processor 106 to perform the techniques discussed herein. In some instances, the memory 108 can store, for example, one or more software programs and/or code that can include instructions to cause the processor 106 to perform one or more processes, functions, and/or the like. In some implementations, the memory 108 can include extendible storage units that can be added and used incrementally. In some implementations, the memory 108 can be a portable memory (for example, a flash drive, a portable hard disk, and/or the like) that can be operatively coupled to the processor 106. In some instances, the memory 108 can be remotely operatively coupled with a compute device (not shown in FIG. 1).

In some implementations, incident light from a scene propagates to/through the meta-optics lens 102, and the meta-optics lens 102 outputs transformed light. Values for a set of mathematical properties (e.g., one mathematical property, two mathematical properties, etc.) of the transformed light are dependent upon wavelengths associated with the incident light. For example, a size, distance, angle, rotation, location, intensity, shape, and/or the like of the transformed light and/or a portion(s) of the transformed light (e.g., foci) can be dependent upon the wavelengths associated with the incident light. For instance, two foci included in transformed light may have a first rotation angle when incident light has a first set of wavelengths, and a second rotation angle when incident light has a second set of wavelengths different than the first set of wavelengths. In some implementations, the transformed light is associated with (e.g., represented by, used to generate a representation of, etc.) an N×M×K frame, N being a number of sensor elements in a first direction (e.g., x-direction) for a sensor array (e.g., captured using image sensor 104), M being a number of sensor elements in a second direction (e.g., y-direction) for the sensor array, and K being a number of color channels (i.e., wavelength bins). For example, together, N×M can represent the plane where the sensor array is location, and K can represent a number of wavelength bins that the transformed light is to be distributed amongst.

The transformed light can travel to the image sensor 104. The image sensor 104 can receive/capture the transformed light, and send a representation (e.g., electrical signal(s)) of the transformed light to the processor 106 and/or the memory 108.

The memory 108 can store and/or have access to representations of a point spread function (PSF) 112 and a machine learning (ML) model 114. The PSF 112 can indicate (characterize) a response of the meta-optics lens 102 to a point source or point object. The ML model(s) 114 can determine the set of mathematical properties of the transformed light based on the representation of the transformed light received from the image sensor 104 and the PSF 112 characterization of the meta-optics lens 102. Additionally, the ML model(s) 114 can generate hyperspectral information 116 based on the set of mathematical properties of the transformed light and/or the PSF 112. In some implementations, this hyperspectral information 116 can then be used (e.g., in conjunction with encoded image information) to generate an image of the scene (e.g., by imaging system 100 and/or a different compute device not shown in FIG. 1). In some implementations, the ML model 114 is a neural network(s).

The housing 110 can be any type of housing suitable to house the meta-optics lens 102, image sensor 104, processor 106, and/or memory 108. For example, the housing 110 can be a metal housing, a ceramic housing, a plastic housing, and/or the like. The housing 110 can include an aperture so that incident light can propagate to and be received at the meta-optics lens 102. The housing 110 can protect the meta-optics lens 102, image sensor 104, processor 106, and/or memory 108 from undesirable environmental effects such as thermal effects and being dropped.

In some implementations, the meta-optic lens 102 is substantially flat, transparent at visible and infrared wavelengths (i.e., the meta-optic lens 102 has a substantially uniform spectral response at visible and infrared wavelengths), and/or compatible with single-stage lithography processes. The meta-optic lens 102 can include, for example, a patterned dielectric layer having a range of different widths; in some implementations, the dielectric can be gallium nitride, silicon nitride, and/or titanium dioxide. In some implementations, a shape of the meta-optic lens 102 is, for example, not substantially convex nor substantially concave. The term "substantially" is used to account for variability (e.g., manufacturing variability, environmental variability, etc.) that may occur.

In some implementations, the meta-optics lens 102 is a double helix meta-optics lens. In some implementations, the transformed light output by the meta-optics lens 102 includes at least two foci (e.g., two foci, three foci, four foci, etc.). In some implementations, the meta-optics lens 102 is a single meta-optics lens. In some implementations, the meta-optics lens 102 includes multiple different meta-optic lens (e.g., green spectrometer meta-optic, full visible range meta-optic, etc.).

Although FIG. 1 shows a single meta-optics lens, any number of meta-optics lenses can be used (e.g., 1, 2, 3, etc.). Additionally, although FIG. 1 shows a single image sensor, any number of image sensors can be used (e.g., 1, 2, 3, etc.). In some implementations, the number of meta-optics lenses used is the same as the number of image sensors used. In some implementations, the number of meta-optics lenses used is not the same as the number of image sensors used. In some implementations, a size of meta-optics lens 102 is substantially similar to (e.g., within 1%, within 5%, within 10%, within 25%, etc.) a size of the image sensor 104. In some implementations, a distance between the meta-optics lens 102 and image sensor 104 is approximately 7.2 centimeters (e.g., plus or minus 1%, 5%, 10%, 25%, and/or the like).

In some implementations, the imaging system 100 is used to generate an image of scene. For example, a first portion of an image sensor 104 can receive a first transformed light that was generated from incident light of a scene reaching a first portion of the meta-optics lens 102 to generate a hyperspectral image, while a second portion of the image sensor 104 can receive a second transformed light that was generated from incident light reaching a second portion of the meta-optics lens 102 to generate an encoded image. The hyperspectral image and the encoded image of the scene can then be used to generate a final image of the scene. The first portion of the meta-optics lens 102 and the second portion of the meta-optics lens 102 can be of the same meta-lens or different meta-lenses.

In some implementations, a first image sensor receives transformed light generated from a first-meta optics lens, and a second image sensor different from the first image sensor receives transformed light generated from a second meta-optics lens different than the first meta-optics lens. For example, a first image sensor receives transformed light generated from a first-meta optics lens to generate a hyperspectral image, and a second image sensor receives transformed light generated from a second meta-optics to generate an encoded image.

Figure 2:
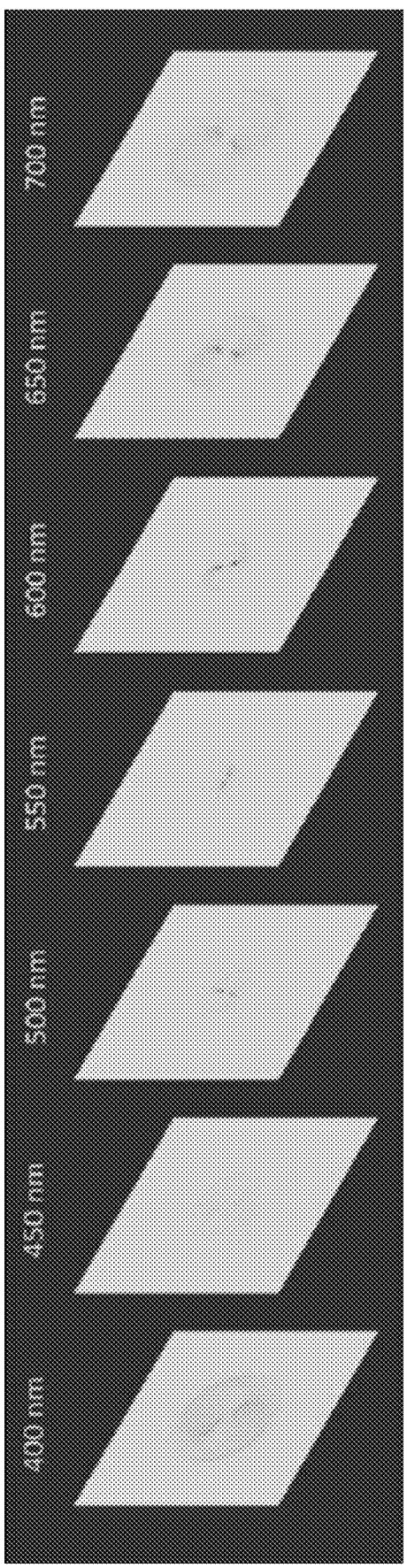
FIG. 2 shows examples of point spread functions associated with a double helix meta-optic lens at different wavelengths, according to an embodiment.

FIG. 2 shows examples of point spread functions (e.g., PSFs 112) associated with a double helix meta-optic lens (e.g., meta-optics lens 102) at different wavelengths, according to an embodiment. The PSFs for wavelengths 400 nanometers (nm), 450 nm, 500 nm, 550 nm, 600 nm, 650 nm, and 700 nm, after passing through the double helix meta-optics lens, each have differences between one another. The PSFs associated with 400 nanometers (nm), 450 nm, 500 nm, 550 nm, 600 nm, 650 nm, and 700 nm each have two lobes (i.e., foci), whose mathematical properties (e.g., shape, size, rotation angle, and/or the like) vary at different wavelengths. These differences are be exploited to determine hyperspectral information for light.

Figure 3:
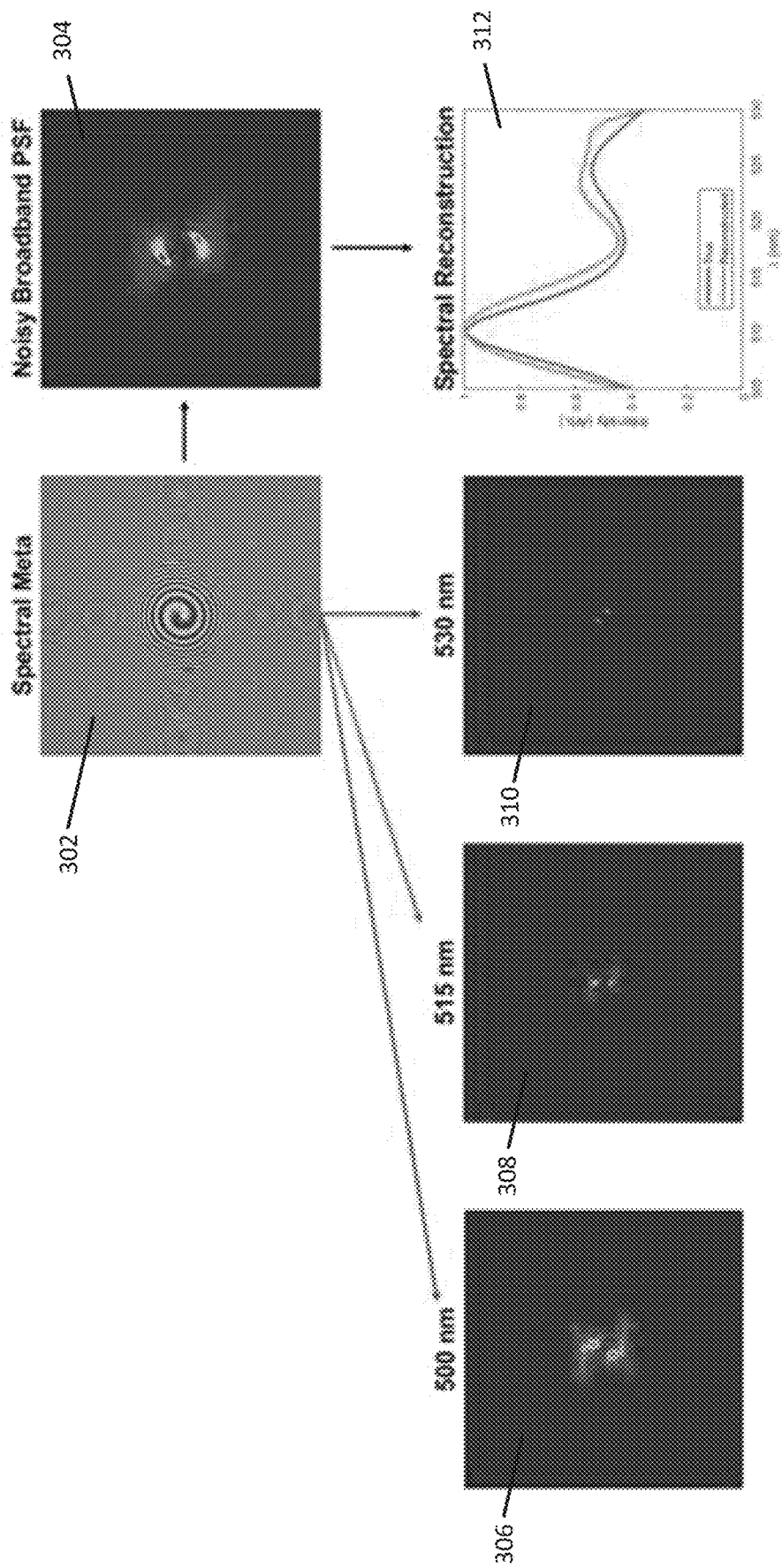
FIG. 3 shows an example of a spectral reconstruction using a point spread function, according to an embodiment.

FIG. 3 shows an example of a spectral reconstruction using a point spread function, according to an embodiment. Image 302 shows a representation of a double-helix metasurface(s) that produces a PSF having two foci that rotate at the sensor plane as the illumination wavelength changes, producing distinct PSFs for each wavelength. For example, image 306 shows a PSF produced by the double-helix metasurface(s) at 500 nm, image 308 shows a PSF produced by the double-helix metasurface(s) at 515 nm, and image 310 shows a PSF produced by the double-helix metasurface (s) at 530 nm. When illuminated with broadband light, a PSF comprising a superposition of spectrally weighted PSFs is formed on a sensor, as shown at image 304. By calibrating the metasurface PSF, the spectrum can be decoded by using inversion techniques such a Tikhonov regularization. Image 312 shows an example reconstruction for a visible wavelength, simulated metasurface spectrometer, demonstrating strong agreement between the reconstructed and true spectrum.

FIGS. 4A-4C shows examples of light produced by a meta-optics lens and an associated spectral reconstruction, according to an embodiment. Images 402A, 402B, and 402C from FIGS. 4A, 4B, and 4C (respectively) show a PSF received at an image sensor as incident light contacts and passes through a meta-optics lens. Graphs 404A, 404B, 404C from FIGS. 4A, 4B, and 4C (respectively) shows spectral reconstructions (labelled "Reconstructed" or "Meta-optical Spectrometer") generated using images 402A, 402B, and 402C (respectively). The spectral reconstruction from graphs 404A, 404B, and 404C are also compared to reference spectral information (labelled "Manufacturer Data" or "Commercial Spectrometer") for comparison.

Figure 5:
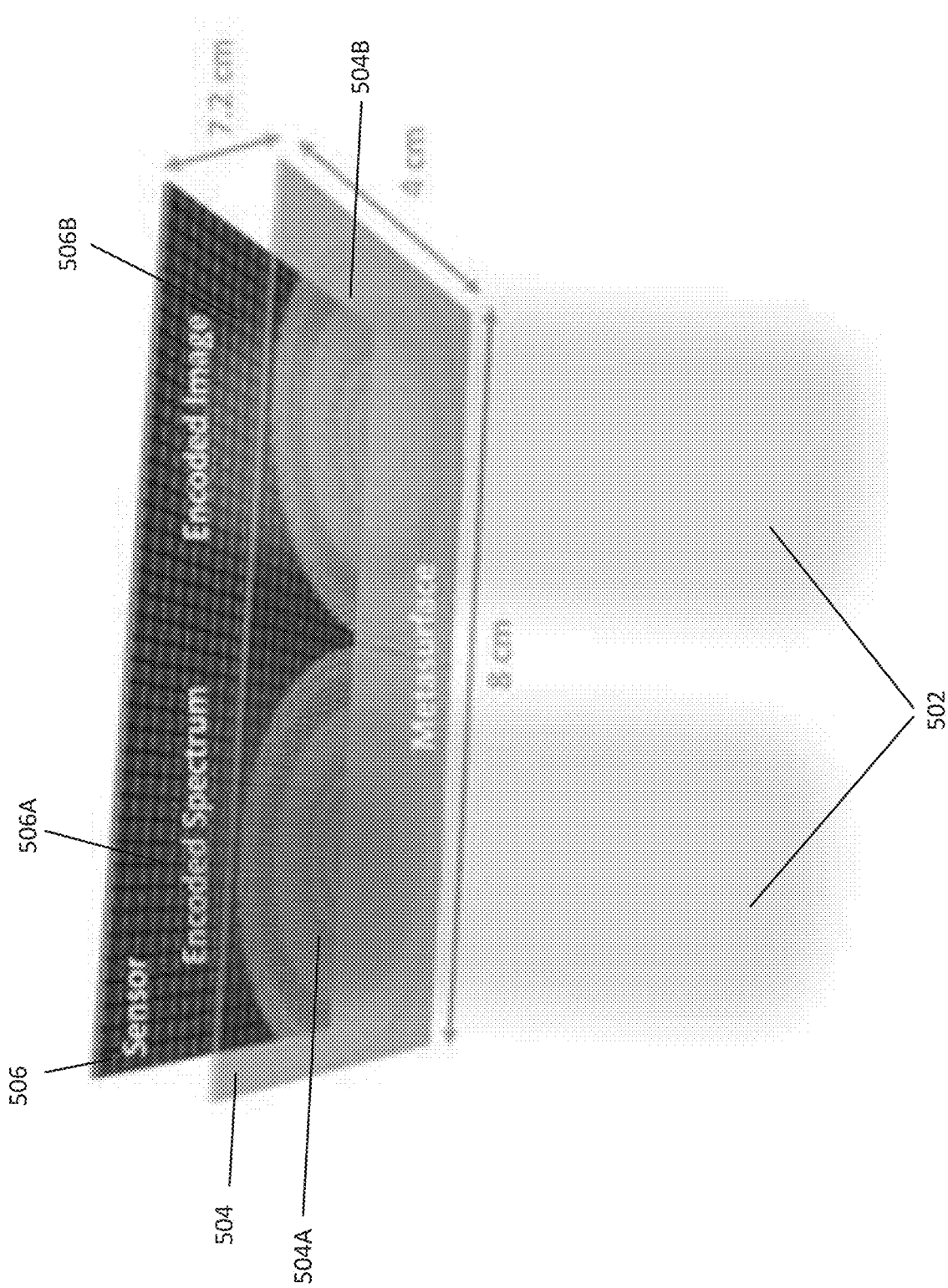
FIG. 5 shows a meta-optical hyperspectral imaging system, according to an embodiment.

FIG. 5 shows a meta-optical hyperspectral imaging system, according to an embodiment. The hyperspectral imaging system includes a metasurface 504 and an image sensor 506. The metasurface 504 includes a first meta-optics lens 504A and a second meta-optics lens 504B, and the image sensor 506 includes a first image sensor portion 506A and a second image sensor portion 506B. The first image sensor portion 506A receives light representing an encoded spectrum that was generated as incident light 502 from a scene propagated through the first meta-optics lens 504A. The second image sensor portion 506B receives light representing an encoded image that was generated as incident light 502 propagated through the second meta-optics lens 504B. Thereafter, the encoded spectrum and encoded image can be used to create an image of the scene.

As can be seen in FIG. 5, the metasurface 504 has a height of 4 centimeters (cm) and a length of 8 cm. Additionally, the distance between the metasurface 504 and image sensor 506 is 7.2 cm. It can be appreciated, however, that the dimensions of the metasurface 504 and/or distance between the metasurface 504 and image sensor 506 can vary in other implementations (e.g., by plus or minus 1%, 5,%, 10%, 25%, 50%, and/or the like).

Although the metasurface 504 of FIG. 5 has two meta-optics lens 504A and 504B, in some implementations, the metasurface 504 can include any number of meta-optics (e.g., 1, 3, 4, and/or the like), where the different meta-optics can be the same, different, or a combination thereof. For example, in some implementations, the metasurface 504 is a single meta-optics lens, where different portions of that single meta-optics lens can be used to generate the encoded spectrum information and the encoded image information, respectively. In some implementations, the metasurface 504 can be made in two or more separate pieces, then put together (e.g., mounted together, via an adhesive, etc.).

Although the meta-optical hyperspectral imaging system of FIG. 5 had a single image sensor 506, in some implementations, any number of image sensors can be used. For example, a first image sensor can be used to capture the encoded spectrum information, and a second image sensor different than the first image sensor can be used to capture the encoded image information. In some implementations, the image sensor 506 can be made in two or more separate pieces, then put together (e.g., mounted together, via an adhesive, etc.).

FIG. 6 shows a flowchart of a method 600 for generating an image associated with a scene based on spectrum information, according to an embodiment. In some implementations, method 600 can be performed by a processor (e.g., processor 106) included in an imaging system (e.g., imaging system 100).

At 602, a representation of transformed light is received. A meta-optics lens (e.g., meta-optics lens 102) is configured to receive light associated with a scene and output the transformed light. For example, the transformed light can be output to/captured by an image sensor (e.g., image sensor 104), and sent to a processor (i.e., received by the processor) for further processing. In some implementations, the meta-optics lens is a double helix meta-optics lens. In some implementations, the transformed light includes a representation of at least three foci. In some implementations, the transformed light includes a representation of a first foci and a second foci symmetric to the first foci.

At 604, a value of at least one mathematical property of the transformed light is determined. The value of the at least one mathematical property is dependent upon a set of wavelengths associated with light received by the meta-optics lens. Said similarly, the value of the at least one mathematical property may change depending on the set of wavelengths associated with the light. In some implementations, the at least one mathematical property includes a rotation angle. In some implementations, the at least one mathematical property includes a distance between a first foci and a second foci (e.g., where the first foci is symmetric to the second foci). In some implementations, the at least one mathematical property includes a size of the first foci and a size of the second foci (e.g., where the first foci is symmetric to the second foci).

At 606, spectrum information (e.g., hyperspectral information 116) associated with light is determined using the value of the at least one mathematical property and a point spread function (e.g., PSF 112). For example, the value of the at least one mathematical property and the point spread function can indicate what wavelengths are present in the light, as well as the intensity of those wavelengths. Example representations of spectrum information are shown in image 312 and graphs 404A-404C.

At 608, an image associated with a scene is generated based on the spectrum information. For example, the image can be generated using the spectrum information and encoded image information captured using (1) a different meta-optics lens and/or a different portion of the same meta-optics lens and (2) a different image sensor and/or a different portion of the same image sensor.

In some implementations of method 600, the light is received at a first portion of the meta-optics lens, the transformed light is a first transformed light, and the image sensor is configured to capture the first transformed light at a first portion of the image sensor. A second portion of the meta-optics lens mutually exclusive from the first portion of the meta-optics lens is configured to receive the light and output a second transformed light, where the value of the at least one mathematical property of the second transformed light is not dependent upon the set of wavelengths associated with the light. The image sensor is configured to generate image data representing the scene in response to capturing the second transformed light at a second portion of the image sensor mutually exclusive from the first portion of the image sensor. Therefore, generating the image at 608 is further based on the image data. In some instances, the first portion of the meta-optics lens is configured to disperse the light as a function of a set of spectral ranges associated with the light, and the second portion of the meta-optics lens is configured to capture the scene. For example, the first portion of the meta-optics lens can be designed for the separation of light and can be optimized for a spectral range or multiple spectral ranges, and the second portion of the meta-optics lens can be optimized for scene capture. The first portion of the meta-optics lens and the second portion of the meta-optics lens can be different meta-optics lenses, or portions of the same meta-optics lens.

In some implementations of method 600, the meta-optics lens is configured to receive the light at a first portion of the meta-optics lens, the transformed light is a first transformed light, and a second portion of the meta-optics lens mutually exclusive from the first portion of the meta-optics lens is configured to receive the light and output a second transformed light, where the value of the at least one mathematical property of the second transformed light is not dependent upon the set of wavelengths associated with the light. A second image sensor different than the first image sensor is configured to generate image data representing the scene in response to capturing the second transformed light at the second image sensor, where the second image sensor is operatively coupled to the processor, and generating the image at 608 is further based on the image data. The first portion of the meta-optics lens and the second portion of the meta-optics lens can be different meta-optics lenses, or portions of the same meta-optics lens.

In some implementations of method 600, the meta-optics lens is configured to receive the light associated with the scene at a first portion of the meta-optics lens, the transformed light is first transformed light, and the meta-optics lens further includes a second portion configured to receive the light associated with the scene and output a second transformed light. The second portion can be a different meta-optics lens, or part of the same meta-optics lens. In such a case, the image of the scene can be generated based on image information represented by the second transformed light and the spectrum information.

FIG. 7 shows a flowchart of a method 700 to cause an image representing a scene to be generated based on spectrum information and image information, according to an embodiment. In some implementations, method 700 can be performed by a processor (e.g., processor 106) included in an imaging system (e.g., imaging system 100).

At 702, a first transformed light is analyzed to determine a value of at least one mathematical property of the first transformed light. The first transformed light is generated via a first portion of a meta-optics lens (e.g., meta-optics lens 102) configured to transform a light associated with a scene to the first transformed light. A wavelength dependent point spread function (e.g., PSF 112) characterizes the meta-optics lens. In some implementations, the first transformed light includes a first foci and a second foci, and the value is a rotation angle associated with the first foci and the second foci. In some implementations, the first transformed light includes a first foci and a second foci, and the value is a distance between the first foci and the second foci. In some implementations, the meta-optics lens has a length that is between 7.8 centimeters and 8.2 centimeters, and the meta-optics lens has a height that is between 3.8 centimeters and 4.2 centimeters. In some implementations, the first transformed light is associated with an N×M×K frame, N being a number of sensor elements in a first direction for a sensor array, M being a number of sensor elements in a second direction for the sensor array, and K being a number of color channels.

At 704, spectrum information (e.g., hyperspectral information 116) associated with the scene is determined based on the value of the at least one mathematical property of the first transformed light and the wavelength dependent point spread function. For example, the value of the at least one mathematical property of the first transformed light and the wavelength dependent point spread function can indicate what wavelengths are present in the light, as well as the intensity of those wavelengths.

At 706, image information associated with the scene is determined based on a second transformed light different than the first transformed light. The second transformed light is generated via a second portion of the meta-optics lens mutually exclusive from the first portion of the meta-optics lens. The first portion of the meta-optics lens and the second portion of the meta-optics lens can be different meta-optics lenses, or portions of the same meta-optics lens.

At 708, an image representing the scene is caused to be generated (e.g., by sending an electronic signal) based on the spectrum information and the image information. For example, in some implementations, 708 includes (1) generating a plurality of images representing the scene using the image information and the spectrum information, where each image from the plurality of images representing the scene associated with a wavelength included in the spectrum information is different than remaining images from the plurality of images of the scene (e.g., one image indicating how much blue, another indicating how much red, etc.), and (2) overlaying and aligning the plurality of images to generate the image representing the scene.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. An apparatus, comprising:
a meta-optics lens having a point spread function, the meta-optics lens configured to receive light associated with a scene at a first portion of the meta-optics lens and output first transformed light, a second portion of the meta-optics lens mutually exclusive from the first portion of the meta-optics lens configured to receive the light and output a second transformed light representing an encoded image, a value of at least one mathematical property of the first transformed light being dependent upon a set of wavelengths associated with the light;
an image sensor configured to capture the first transformed light; and
a processor, operatively coupled to the image sensor, configured to:
receive a representation of the first transformed light from the image sensor;
determine the value of the at least one mathematical property of the first transformed light;
determine spectrum information associated with the light using the value of the at least one mathematical property and the point spread function; and
generate an image associated with the scene based on the spectrum information.

2. The apparatus of claim 1, wherein:
the image sensor is configured to capture the first transformed light at a first portion of the image sensor,
a value of the at least one mathematical property of the second transformed light is not dependent upon the set of wavelengths associated with the light,
the image sensor is configured to generate image data representing the scene in response to capturing the second transformed light at a second portion of the image sensor mutually exclusive from the first portion of the image sensor, and
the processor is configured to generate the image associated with the scene by generating the image associated with the scene further based on the image data.

3. The apparatus of claim 2, wherein the first portion of the meta-optics lens is configured to disperse the light as a function of a set of spectral ranges associated with the light, and the second portion of the meta-optics lens is configured to capture the scene.

4. The apparatus of claim 1, wherein:
a value of the at least one mathematical property of the second transformed light is not dependent upon the set of wavelengths associated with the light,
the image sensor is a first image sensor,
a second image sensor different than the first image sensor is configured to generate image data representing the scene in response to capturing the second transformed light at the second image sensor,
the second image sensor is operatively coupled to the processor, and
the processor is configured to generate the image associated with the scene by generating the image associated with the scene further based on the image data.

5. The apparatus of claim 1, wherein the at least one mathematical property includes a rotation angle.

6. The apparatus of claim 1, wherein the meta-optics lens is a double helix meta-optics lens.

7. The apparatus of claim 1, wherein the meta-optics lens includes at least one of gallium nitride, silicon nitride, or titanium dioxide.

8. The apparatus of claim 1, wherein the first transformed light includes a representation of a first foci and a second foci symmetric to the first foci about an axis of a spectral reconstruction that includes the first foci and the second foci.

9. The apparatus of claim 8, wherein the at least one mathematical property includes a distance between the first foci and the second foci.

10. The apparatus of claim 8, wherein the at least one mathematical property includes a size of the first foci and a size of the second foci.

11. A method, comprising:
analyzing a first transformed light to determine a value of at least one mathematical property of the first transformed light, the first transformed light generated via a first portion of a meta-optics lens configured to transform a light associated with a scene to the first transformed light, a wavelength dependent point spread function characterizing the meta-optics lens;
determining spectrum information associated with the scene based on the value of the at least one mathematical property of the first transformed light and the wavelength dependent point spread function;

determining image information associated with the scene based on a second transformed light different than the first transformed light and representing an encoded image, the second transformed light generated via a second portion of the meta-optics lens mutually exclusive from the first portion of the meta-optics lens; and causing an image representing the scene to be generated based on the spectrum information and the image information.

12. The method of claim 11, wherein the first transformed light includes a first foci and a second foci, and the value is a rotation angle associated with the first foci and the second foci.

13. The method of claim 11, wherein the first transformed light includes a first foci and a second foci, and the value is a distance between the first foci and the second foci.

14. The method of claim 11, wherein the meta-optics lens has a length that is between 7.8 centimeters and 8.2 centimeters, and the meta-optics lens has a height that is between 3.8 centimeters and 4.2 centimeters.

15. The method of claim 11, wherein causing the image representing the scene to be generated includes:

generating a plurality of images representing the scene using the image information and the spectrum information, each image from the plurality of images representing the scene associated with a wavelength included in the spectrum information different than remaining images from the plurality of images of the scene; and overlaying and aligning the plurality of images to generate the image representing the scene.

16. The method of claim 11, wherein the first transformed light is associated with an N×M×K frame, N being a first number of spatial points, M being a second number of spatial points, and K being a number of color channels.

17. An apparatus, comprising:

a meta-optics lens having a point spread function, the meta-optics lens configured to receive light associated with a scene at a first portion of the meta-optics lens and output a first transformed light, a second portion of the meta-optics lens mutually exclusive from the first portion of the meta-optics lens configured to generate a second transformed light, at least one value of at least one mathematical property of the first transformed light being dependent upon a set of wavelengths associated with the light; and a processor configured to:

receive a representation of the first transformed light, determine the at least one value of the at least one mathematical property of the first transformed light using the representation of the first transformed light, and determine spectrum information associated with the scene based on the at least one value of the at least one mathematical property and the point spread function.

18. The apparatus of claim 17, wherein a value of the at least one mathematical property of the second transformed light is not dependent upon the set of wavelengths associated with the light, and the processor is further configured to generate an image of the scene based on image information represented by the second transformed light and the spectrum information.

19. The apparatus of claim 17, wherein the meta-optics lens is a double helix meta-optics lens.

20. The apparatus of claim 17, wherein the first transformed light includes a representation of at least three foci.

21. The apparatus of claim 17, wherein the at least one mathematical property includes at least one of a rotation angle of a first foci and a second foci of the first transformed light, a distance between the first foci and the second foci, a size of the first foci, a size of the second foci, a shape of the first foci, or a shape of the second foci.

22. The apparatus of claim 17, wherein the apparatus is a spectrometer.

* * * * *